United States Patent
Nguyen

(10) Patent No.: US 10,771,127 B2
(45) Date of Patent: Sep. 8, 2020

(54) METHODS OF SIGNALLING IN AN ADVANCED WIRELESS COMMUNICATION SYSTEM SUPPORTING MULTI-USER SUPERPOSITION TRANSMISSION

(71) Applicant: NEC CORPORATION, Tokyo (JP)

(72) Inventor: Phong Nguyen, Victoria (AU)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 16/319,008

(22) PCT Filed: Apr. 4, 2017

(86) PCT No.: PCT/JP2017/014077
§ 371 (c)(1),
(2) Date: Jan. 18, 2019

(87) PCT Pub. No.: WO2018/016135
PCT Pub. Date: Jan. 25, 2018

(65) Prior Publication Data
US 2019/0280742 A1     Sep. 12, 2019

(30) Foreign Application Priority Data
Jul. 20, 2016  (AU) .............................. 2016902850

(51) Int. Cl.
*H04B 7/0452*  (2017.01)
*H04W 76/27*  (2018.01)
(Continued)

(52) U.S. Cl.
CPC ........ *H04B 7/0452* (2013.01); *H04J 11/0036* (2013.01); *H04J 13/00* (2013.01); *H04W 72/042* (2013.01); *H04W 76/27* (2018.02)

(58) Field of Classification Search
CPC .. H04B 7/0452; H04W 72/042; H04W 76/27; H04J 11/0036
(Continued)

(56) References Cited

U.S. PATENT DOCUMENTS

2015/0282150 A1  10/2015  Nigam et al.
2016/0037460 A1   2/2016  Benjebbour et al.
(Continued)

FOREIGN PATENT DOCUMENTS

CN      103620984 A     3/2014
CN      104081697 A    10/2014
(Continued)

OTHER PUBLICATIONS

NEC, "Downlink Control Signalling for MUST", 3GPP TSG RAN WG1 Meeting #83, R1-156671, Nov. 16-20, 2015, 3 pgs., Anaheim, USA.
(Continued)

*Primary Examiner* — Juan A Torres
(74) *Attorney, Agent, or Firm* — Sughrue Mion, PLLC

(57) ABSTRACT

An advanced wireless communication system supporting Multi-User Superposition Transmission (MUST) includes a plurality of UEs and an advanced base station. A method of using the advanced wireless communication system includes receiving, from a MUST-UE, a MUST receiver scheme; determining a baseline size of second downlink control information according to the received MUST receiver scheme and a MUST transmission technique; configuring the MUST-UE to operate according to a MUST configuration, the MUST configuration including the MUST transmission technique; and transmitting, to the MUST-UE: first downlink control information, including an indication that MUST is used; second downlink control information including assistant information according to the determined base-
(Continued)

line size; and a MUST composite data signal on an associated DL shared channel, according to the MUST transmission technique.

20 Claims, 10 Drawing Sheets

(51) Int. Cl.
*H04J 11/00* (2006.01)
*H04W 72/04* (2009.01)
*H04J 13/00* (2011.01)

(58) Field of Classification Search
USPC .......................................................... 375/262
See application file for complete search history.

(56) References Cited

U.S. PATENT DOCUMENTS

2018/0019794 A1* 1/2018 Kowalski .................. H04L 1/00
2018/0331859 A1* 11/2018 Kim ..................... H04B 7/0486

FOREIGN PATENT DOCUMENTS

| | | |
|---|---|---|
| CN | 104620523 A | 5/2015 |
| CN | 105722229 A | 6/2016 |
| EP | 2993951 A1 | 3/2016 |
| EP | 3038422 A1 | 6/2016 |
| JP | 2014-204277 A | 10/2014 |
| WO | 2013/048401 A1 | 4/2013 |
| WO | 2015/167714 A1 | 11/2015 |

OTHER PUBLICATIONS

International Search Report for PCT/JP2017/014077 dated, Jun. 27, 2017 (PCT/ISA/210).
Written Opinion of the International Searching Authority for PCT/JP2017/014077 dated, Jun. 27, 2017 (PCT/ISA/237.
ASUSTeK: "Discussion on Downlink Control Signaling for MUST", 3GPP TSG-RAN WG1 Meeting #85, R1-165265, May 23-27, 2016, (3 pages total).
Communication dated Jun. 26, 2019 from the European Patent Office in counterpart application No. 17830655.1.
Communication dated Feb. 3, 2020, from the China National Intellectual Property Administration in Application No. 201780044533.1.

* cited by examiner

72
- 72.1 → 1.> DCI-E-M-Offset:4bits
  >>0000, to 1111: Representing numerate value of 0,1,2,3, to 15;
- 72.2 → 2.> CCE-Offset: 4bits
  >>0000, to 1111: Representing numerate value of 0,1,2,3, to 15;
- 72.3 → 3.> Blind-decoding: 1 bit;
- 72.3.1 → 3.1.>> 0: blind-decoding is not required;
  >>>Lower-bound CCE-aggregation level=> define the aggregation level for direct decoding;
  >>> Upper-bound CCE-aggregation level=> Lower-bound CCE-aggregation level;
- 72.3.2 → 3.2.>> 1: blind decoding is required;
  >>> Upper-bound CCE-aggregation level define the highest CCE aggregation for blind-decoding
  >>> Lower-bound CCE-aggregation level define the lowest CCE aggregation for blind-decoding
  within the defined upper-bound
- 72.4 → 4.> Upper-bound CCE-aggregation level: 3 bits
  >> 000, 001, 010, ⋯or 111: Representing numerate value of 0, 1, 2, 3, ⋯to 7;
- 72.5 → 5.> Lower-bound CCE-aggregation level: 3 bits
  >> 000, 001, 010, ⋯or 111: Representing numerate value of 0, 1, 2, 3, ⋯to 7;
- 72.6 → 6.> MUST-Category: 2 bits; => indicating MUST category used at the servicing base-station
  in construction MUST composite signal

Fig. 3

METHODS OF SIGNALLING IN AN ADVANCED WIRELESS COMMUNICATION SYSTEM SUPPORTING MULTI-USER SUPERPOSITION TRANSMISSION

CROSS REFERENCE TO RELATED APPLICATIONS

This application is a National Stage of International Application No. PCT/JP2017/014077 filed Apr. 4, 2017, claiming priority based on Australian Patent Application No. 2016902850, filed Jul. 20, 2016, the disclosure of which is incorporated herein in its entirety by reference.

TECHNICAL FIELD

The present invention relates to wireless data communication. In particular, the present invention relates to Multi User Superposition Transmission (MUST) of data.

BACKGROUND ART

<Abbreviations>

| | |
|---|---|
| 3GPP | $3^{rd}$ Generation Partnership Project |
| BS | Base station |
| CAT | Category |
| CDMA | code division multiple access |
| CONS | Disadvantages |
| CRC | Cyclic Redundancy check |
| CWIC | Codeword level successive interference cancellation |
| DCI | Downlink control information |
| DCI-E | Enhanced Downlink control information assisting MUST operation |
| DCI-M | Down Link Control Information carrying assistant information for MUST data signal reception and decoding |
| DL | Downlink |
| eNB | Enhance NodeB |
| ePDCCH | Enhanced Physical Downlink Control Channel |
| FDMA | frequency division multiple access |
| IPs | Intellectual properties |
| L-CWIC | Linear codeword level successive interference cancellation |
| LTE | Long Term Evolution |
| LTE-A | LTE-Advanced |
| ML | Maximum Likelihood |
| ML-CWIC | Maximum likelihood codeword level successive interference cancellation |
| MUST | Multi User Superposition Transmission |
| OFDMA | Orthogonal Frequency Division Multiple Access |
| PDCCH | Physical Downlink Control channel |
| PDSCH | Physical Downlink Shared channel |
| PROS | Advantages |
| RAN | Radio Access Network |
| RAT | Radio Access technology |
| RE | Resource Element |
| RI | Rank Indicator |
| R-ML | Reduced complexity maximum likelihood |
| RNTI | Radio Network Temporary Identifier |
| RRC | Radio Resource control |
| SC-FDMA | Single Carrier-FDMA |
| SIC | Successive Interference Cancellation |
| SINR | Signal to Interference plus Noise ratio |
| SLIC | Symbol level interference cancellation |
| SNR | Signal to Noise ratio |
| TDMA | Time Division Multiple Access |
| UE | User equipment |
| UL | Uplink |

It is anticipated that mobile traffic will increase drastically in the coming years, and some estimate that mobile traffic will increase more than 500 fold in the coming decade. In order to cater for this massive increase in mobile traffic, new solutions that increase the capacity of mobile networks are required.

An important aspect of improving system capacity in cellular communication has been the design of cost-effective radio access technologies (RATs). Typically, RATs are characterised by multiple access schemes, such as frequency division multiple access (FDMA), time division multiple access (TDMA), code division multiple access (CDMA) and orthogonal-frequency division multiple access (OFDMA), each of which provides means for multiple users to access and share system resources simultaneously.

Current mobile communication systems such as Long-Term Evolution (LTE) and LTE-advanced employ OFDMA for downlink (DL) and single carrier (SC)-FDMA for uplink (UL). The use of OFDMA in LTE enables good system capacity, while retaining a simplified receiver design. Technically, a more advanced receiver design would enable a higher transmission rate, and thus an improved bit rate per channel (i.e. time-frequency unit), boosting spectrum efficiency or spectrum utilisation.

It has been established that superposition coding transmission, together with advanced interference cancellation, can be used to achieve capacity on a Gaussian broadcast channel. Superposition coding is a non-orthogonal scheme which allows multiple users with considerably different SINRs (Signal to Interference and Noise ratios) to share the same resources (i.e. time and frequency resources such as LTE REs) without the needs of spatial separation. Due to its capacity achieving nature, superposition coding mechanisms have been identified as a candidate RAT for new air interfaces in 3GPP 5G networks, and have been endorsed for feasibility studies in 3GPP RAN. In principal, superposition coding or multiuser superposition transmission (MUST) may optimally exploit the channel ordering or the path loss difference of paired users served by the same transmission point.

As illustrated in FIG. 1, a UE 1 who is geographically closer to the base station has a higher channel gain or higher SINR than a UE 2 who is geographically far away from the base station. As such, a downlink transmission that can be decoded at the far-UE (UE 2) can possibly be decoded at the near-UE (UE 1), but not vice versa. Conceptually, the DL transmission power to the far-UE is considerably higher than the DL transmission power to the near-UE, to account for higher path loss.

MUST takes advantage of this considerable transmission power difference by superimposing the downlink transmissions for the near-UE (with low transmit power) in to that for the far-UE (with high transmit power) and transmitting the superimposed or composited signal in the same set of channel resources achieving multiple access gain in the power domain.

Due to the transmission power difference, the signal of the near-UE (UE 1) hardly reaches the far-UE (UE-2) and desirably appears as the noise at the far-UE (UE-2). This allows the far-UE (UE 2) to decode its signal in the traditional way. Since the near-UE (UE-1) has a high channel gain, it can receive and decode far-UE's signal, and cancel or remove the far-UE's signal from the received signal to decode its own signal. This procedure at the near-UE is called successive decoding or successive interference cancellation (SIC).

In order to cancel or remove a signal from a far-UE, or jointly detect and decode a signal of a near-UE with the presence of a far-UE signal, a near UE needs to know some information about the signals of the far UE. According to 3GPP LTE, signal information of a far-UE may be transmitted from a base station as downlink control information (DCI).

Recently, 3GPP RAN-WG1 concluded a feasibility study on MUST with the recommendation of 3 potential MUST categories 1, 2 and 3, and recommendation of candidate receiver schemes for near-UEs including a maximum likelihood (ML) receiver, a reduced complexity maximum likelihood (R-ML) receiver, a symbol level interference cancellation (SLIC) receiver, a linear codeword level successive interference cancellation (L-CWIC) receiver, and a maximum likelihood codeword level successive interference cancellation (ML-CWIC) receiver.

Technically, each of above recommended MUST categories have their own pros and cons, and flexibility, which depends on a base station (eNB) implementation. Therefore, one or more than one or all above mentioned MUST Categories may be endorsed by 3GPP RAN for use as declared implementation options.

Furthermore, receiver schemes generally differ between UE manufacturers, and receiver schemes are generally not mandated by 3GPP. As such, the scheme of a receiver is not known by the servicing base station (eNB) for special services, for additional information, signalling assisting advanced signal reception and/or decoding at the UE receiver, which may prevent proper reception, detection and decoding of a MUST signal at a near-UE.

In order to allow for UE receiver evolution, it is desirable to allow multiple UE receiver schemes to coexist at the same servicing cell/BS. Additionally, it is desirable to supporting different MUST categories at a BS, independent of the near-UE receiver schemes.

Furthermore, due to different downlink data services required by far-UEs and paired near-UE, MUST data signals are generally not required to be transmitted on all scheduled downlink subframes.

SUMMARY OF INVENTION

Technical Problem

There are, however, challenges in providing a system that includes some or all of the desired flexibility discussed above. For example, existing LTE systems can support MUST for downlink data transmission using the currently available DCI formats. In particular, a near-UE may blindly detect and decode its own DCI and the DCI intended to the far-UE that it is scheduled to pair with, to extract or derive information for the reception and decoding of MUST data signals on the associated shared-channel(s).

One problem with this approach of the prior art is that the blind decoding at the near-UE's receiver on every monitored subframe is resource intensive. In particular, as there may be more than one far-UE scheduled for being paired with one near-UE on a subframe, a relatively large number of blind decoding attempts may be required at the near-UE.

Another problem with this approach is that missed-detection and/or false-detection of an intended DCI among the set of required DCIs may lead to further performance degradation.

Yet another problem with this approach is that one UE may be able to extract DCI of other UEs for reception and decoding of the other UEs data channels, which may not be desirable.

It is generally not desirably to provide a new DCI format with a fixed size consisting of all possible assistant information. In particular, the assistant information may be partially used for some UE receivers, and not even used at all, and as such, this approach wastes L1 control resources which are already scarce.

As such, there is a need for an improved method and system for data communication in an advanced wireless network.

It will be clearly understood that, if a prior art publication is referred to herein, this reference does not constitute an admission that the publication forms part of the common general knowledge in the art in Australia or in any other country.

Solution to Problem

The present invention is directed to data communication method and systems, which may at least partially overcome at least one of the abovementioned disadvantages or provide the consumer with a useful or commercial choice.

With the foregoing in view, the present invention in one form, resides broadly in a data communication method for use in an advanced cellular wireless communication system supporting Multi-User Superposition Transmission (MUST), the method comprising:
  receiving, from a MUST-UE, a MUST receiver scheme;
  determining a baseline size of second downlink control information according to the received MUST receiver scheme and a MUST transmission technique;
  configuring the MUST-UE to operate according to a MUST configuration, the MUST configuration including the MUST transmission technique; and
  transmitting, to the MUST-UE:
    first downlink control information, including an indication that MUST is used;
    second downlink control information including assistant information according to the determined baseline size; and
    a MUST composite data signal on an associated DL shared channel, according to the MUST transmission technique.

Preferably, the method further comprises determining that MUST transmission should be used, wherein the second downlink control information and the MUST composite data signal are transmitted in response thereto.

Preferably, the first downlink control information enables dynamic switching between non-MUST and MUST-composite signal transmission and reception on a subframe basis.

Preferably, the MUST configuration includes search space scheduling information for second downlink control information.

Preferably, the MUST configuration is associated with an activation time, and the first downlink control information, the second downlink control information, and the MUST composite data signal are transmitted at or after the activation time.

Preferably, the MUST configuration is provided using Radio Resource Control (RRC) signalling.

Preferably, the MUST configuration includes an offset information element (IE), to inform the MUST-UE of the start of a prescheduled control search space on which it may search for second downlink control information.

Preferably, the MUST configuration includes a control channel element offset IE, to inform the MUST-UE of the starting CCE from which the MUST-UE can extract CCEs for decoding of the second downlink control information.

Preferably, the MUST configuration includes a blind decoding IE to inform the MUST-UE whether it needs to perform blind-decoding for the second downlink control information.

Preferably, the MUST configuration includes an upper bound CCE aggregation level IE, and a lower bound CCE aggregation level IE, indicating upper and lower bounds of the number of CCEs being used for blind decoding for the second downlink control information respectively.

Preferably, the first downlink control information comprises an enhanced 3GPP LTE legacy DCI, further including a dynamic switching indicator field, indicating whether MUST is used, and an associated downlink control information index field, for indicating sizes of the second downlink control information according to the baseline size of second downlink control information.

The method may further comprise:
  determining, on a subframe, that a channel condition is not suitable for MUST composite signal transmission; and
  transmitting, to the MUST-UE:
    first downlink control information, including an indication that MUST is not used; and
    a non-MUST data signal on an associated DL shared channel.

Preferably, the second downlink control information is coded using the first downlink control information as input.

Preferably, the second downlink control information is coded by concatenating the first downlink control information with the second downlink control information to form a payload for cyclic redundancy check (CRC) coding.

Preferably, the CRC coded payload is scrambled with an identifier of the MUST UE.

Preferably the scrambled CRC coded payload is concatenated with the second downlink control information.

In another form, the invention resides broadly in a data communication method for use in an advanced cellular wireless communication system supporting Multi-User Superposition Transmission (MUST), the method comprising:
  reporting, to a MUST base station, a MUST receiver scheme;
  receiving, from the MUST base station, MUST configuration data including a MUST transmission technique;
  determining a baseline size of second downlink control information according to the MUST transmission technique and a MUST receiver scheme;
  receiving, from the MUST base station:
    first downlink control information, including an indication that MUST is used;
    second downlink control information including assistant information according to the determined baseline size; and
    a MUST composite data signal on an associated DL shared channel, according to the MUST transmission technique.

Preferably, the MUST receiver scheme is reported at network registration or a network attach phase of the associated MUST-UE.

The method may further comprise:
  receiving, from the MUST base station:
    first downlink control information, including an indication that MUST is not used;
    a non-MUST data signal on an associated DL shared channel.

Preferably, the first downlink control information includes a dynamic switching indicator field, indicating that MUST is used, and an associated downlink control information index field, indicating sizes of the second downlink control information according to the baseline size of second downlink control information.

The method may further comprise extracting control channel elements (CCEs) according to the MUST configuration, and decoding the second downlink control information from the CCEs.

Preferably, the MUST configuration includes a blind decoding IE indicating that blind decoding is not required, and one-off decoding on the extracted CCEs for the second downlink control information is performed in response thereto.

Preferably, the MUST configuration includes a blind decoding IE indicating that blind decoding is required, and blind decoding on the extracted CCEs for the second downlink control information is performed in response thereto.

Preferably, the MUST configuration defines a maximum number of blind-decoding attempts required to decode the second downlink control information.

In yet another form, the invention resides broadly in an advanced wireless communication system including:
  a plurality of UEs, including at least a MUST-UE; and
  an advanced base station, the advanced base station configured to:
    receive, from the MUST-UE, a MUST receiver scheme;
    determine a baseline size of second downlink control information according to the received MUST receiver scheme and a MUST transmission technique;
    configure the MUST-UE to operate according to a MUST configuration, the MUST configuration including the MUST transmission technique; and
    transmit, to the MUST-UE:
      first downlink control information, including an indication that MUST is used;
      second downlink control information including assistant information according to the determined baseline size; and
      a MUST composite data signal on an associated DL shared channel, according to the MUST transmission technique.

Embodiments of the present invention provide a system signalling architecture and signalling methods for use with a MUST-BS and plurality MUST-UEs to provide subframe scheduled MUST-composite data transmission and reception.

Embodiments of the present invention provide a hybrid signalling method, enabling the transmission of downlink control information for non-MUST data signal transmission, and downlink control information for MUST-composite signal transmission, sharing the same control search space. This may reduce the number of blind decoding attempts required at a MUST-UE.

Embodiments of the present invention provide a signalling method and technique enabling subframe level scheduling of NON-MUST and MUST composite data signals on scheduled DL shared channels.

Embodiments of the present invention provide an efficient error detection method and techniques for use in two part downlink control information that enables detection of false alarm and/or undetected error in a 1st part of downlink control information during the second part error detection.

Embodiments of the present invention provide methods for transmitting and detecting downlink control information assisting the reception and decoding of MUST data signals in a LTE-based advanced cellular wireless communication system.

In one form, embodiments of the invention reside broadly in a system signalling architecture for use in realising MUST in an advanced communication system.

The system signalling architecture may comprise an implicit signalling part and an explicit signalling part. The implicit signalling part may leverage semi-dynamically configured base-station techniques in MUST signal modulation/transmission, and statically registered/reported UE receiver's techniques in MUST signal reception/decoding. In particular, the implicit signalling may include determining baseline sizes of dynamic downlink control information (DCI) which on subframes carry assistant information for MUST composite data signal reception and decoding on associated downlink (DL) shared channels.

The explicit signalling part may comprises semi-dynamically configured control information elements and on subframe dynamically transmitted DCI(s), providing the necessary and required signalling to a UE for detection and decoding of non-MUST or MUST composite data signals on scheduled DL shared channel(s). The DCI may further comprises a first DCI and one or more associated second DCIs where a second DCI carries MUST assistant information and is transmitted only when there is a scheduled MUST composite data signal on an associated DL shared channel. The control information may be semi-dynamic signalling sent in the form of RRC-configuration or RRC-reconfiguration messages that further comprise resource scheduling information for a second DCI transmission and detection.

In another form, the invention resides broadly in hybrid-signalling methods for use in a MUST capable communication system including plurality of MUST capable UEs (MUST-UEs) and a MUST capable base station (MUST-BS).

By leveraging the baseline receiver's technique reported by a MUST-UE and the baseline transmitter's techniques used in generating MUST composite data signal, a MUST-BS may determine the baseline size of a second DCI that will be used for that MUST-UE. On scheduling DL data transmission to a MUST-UE, the MUST-BS may further configure the MUST-UE with a MUST RRC-configuration message for the reception of further scheduled DL shared channel(s).

The transmitted MUST RRC-configuration message may include resource scheduling information elements guiding a RRC-configured MUST-UE where in the configured control region control resource elements are provided for detecting and decoding one for more second DCI intended for it.

On a DL subframe scheduled for DL data transmission to a RRC-configured MUST-UE, a MUST-BS may schedule to transmit a first DCI providing control information for the reception and decoding of NON-MUST data signal on the further transmit associated DL shared channel(s). Alternatively, a MUST-BS may schedule to transmit a first DCI indicating the needs for the reception of one or more further transmitted second DCIs. The first DCI and the associated second DCI may provide control information and assistant information for the reception and decoding of MUST composite data signal on the further transmitted DL shared channel(s).

On DL subframes at and after the activation time of a valid MUST RRC-configuration, a MUST RRC-configured MUST-UE may monitor its configured control region for one or more first DCI(s). For each detected first DCI, the said MUST-UE may check for the existing second DCI. Upon the absence of a second DCI, a MUST-UE may perform the reception of the scheduled DL shared channel(s) using its NON-MUST receiver's technique and control information received on the first DCI. Otherwise, in the presence of second DCI(s), a MUST-UE may use MUST RRC-configured IEs to extract control resource elements in performing one-off second DCI decoding or configurable number of blind decoding attempts for one or more second DCIs.

For each detected first DCI and an associated second DCI, the MUST-UE may extract control information and assistant information for the reception of the scheduled DL shared channel(s) using its MUST receiver's technique.

In yet another form, embodiments of the present invention provide a method for use at a MUST-BS in performing a second DCI coding to improve overall error detection in first and second DCIs, and prevent the second DCI from being intercepted by an unauthorised UE.

The content of a first DCI may be concatenated to the content of an associated second DCI forming a payload for generating 16 cyclic redundancy check (CRC) parity bits. The generated 16-bit CRC is then scrambled with a 16-bit UE-ID, which is attached to the content of the second DCI for further channel coding, rate-matching and multiplexing. Therefore, at a MUST-UE, false detection or an undetected error in a first DCI will be detected during decoding of the associated second DCI, which in turn saves unnecessary signal processing on scheduled DL shared channel(s).

Embodiments of the present invention provide efficient methods for transmitting and detecting downlink control information, assisting in the reception and decoding of dynamically scheduled MUST data signals. The methods may provide more efficient L1 control resource utilisation, decrease the amount of blind decoding required, provide improved security, as well as providing a flexible signalling framework that is capable of adopting further enhanced MUST categories/techniques, as required.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 3 illustrates an exemplary RRC-configuration of the signalling architecture of FIG. 2, according to an embodiment of the present invention;

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
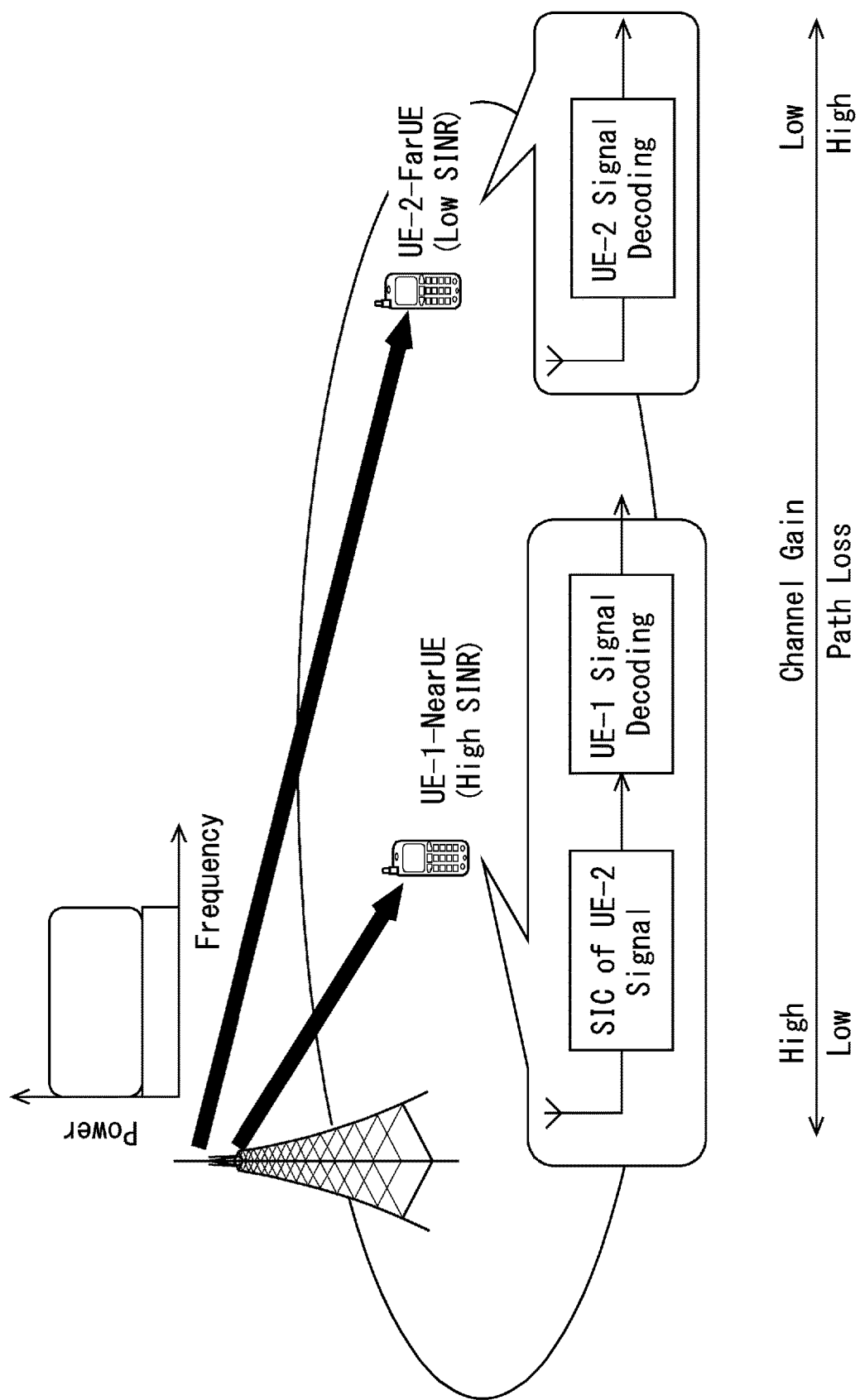
FIG. 1 illustrates channel gain and path loss.
Figure 2:
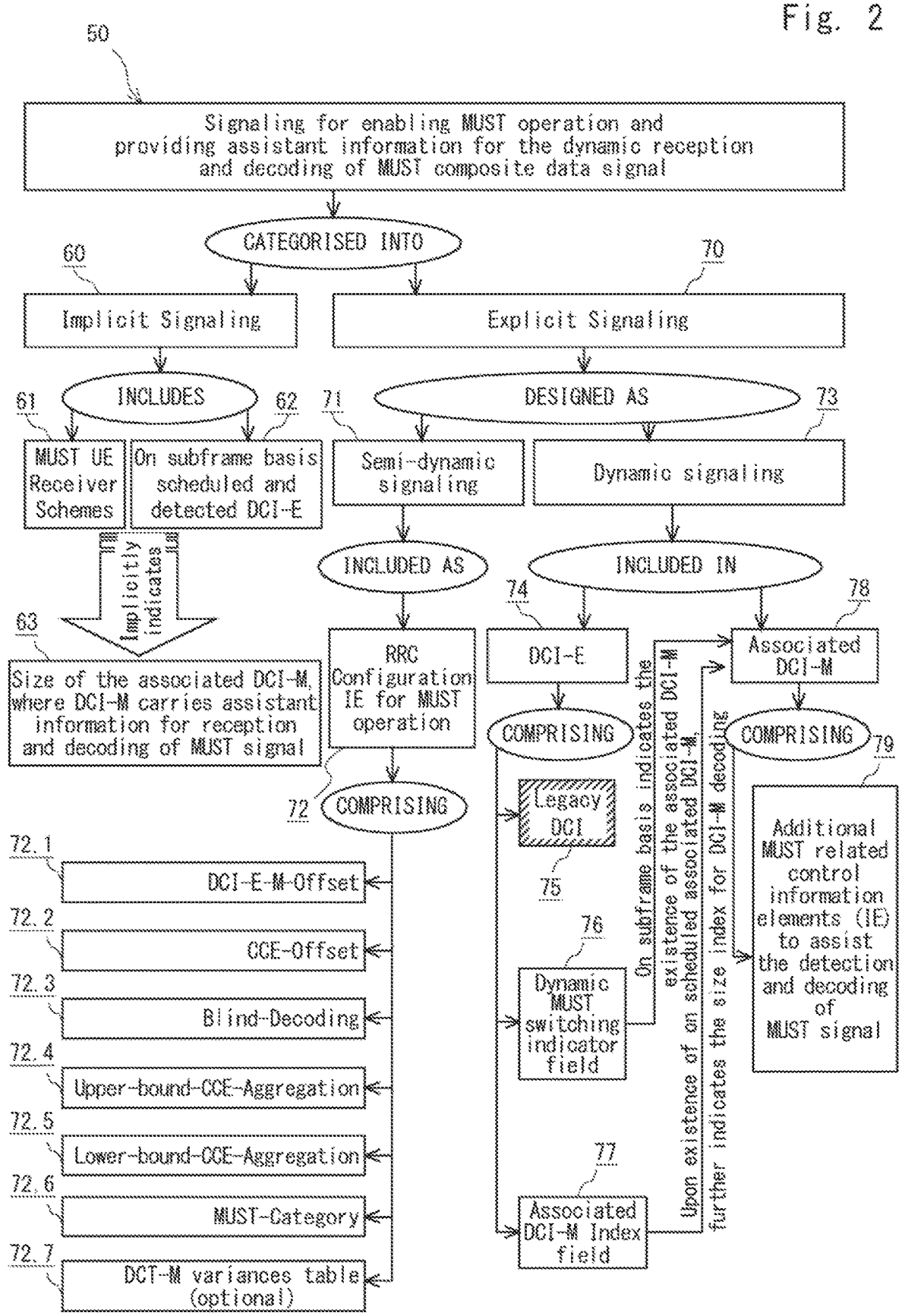
FIG. 2 illustrates a signalling architecture for use in a Multi-User Superposition Transmission (MUST) system, according to an embodiment of the present invention.

FIG. 2 illustrates a signalling architecture 50 for use in a Multi-User Superposition Transmission (MUST) system, according to an embodiment of the present invention. More specifically, the signalling architecture 50 provides assistant information for assisting near-UEs in the reception and decoding of MUST composite data signals.

The signalling architecture 50 comprises implicit signalling 60 and explicit signalling 70. The implicit signalling 60 includes signalling of MUST UE receiver schemes 61, from MUST-UEs (i.e. UE equipped with advanced receiver for MUST composite data signal reception and decoding) to a MUST base station (BS), and signalling of Enhanced Downlink Control Information (DCI-E) 62, which is dynamically scheduled for transmission from the base-station (BS) to the MUST-UEs, on a subframe basis.

The combination of the signalling of a MUST UE Receiver scheme 61 and the DCI-E 62 on a subframe basis implicitly indicates the baseline size of the associated MUST Downlink-Control-Information (DCI-M) 63. The DCI-M carries dynamic assistant information for the reception and decoding of the scheduled MUST composite data signal(s) on associated shared channel(s) at a near-MUST-UE, i.e. a MUST-UE that has been scheduled to pair with one or more far-UEs for the reception and decoding of transmitted MUST composite data signal.

The explicit signalling 70 includes a semi-dynamic signalling part 71 and a dynamic signalling part 73. The semi-dynamic signalling part 71 includes a MUST-RRC-configuration (or reconfiguration) including the following information elements (IE): DCI-E-M-Offset IE 72.1, CCE-Offset IE 72.2, Blind-Decoding IE 72.3, Upper-bound-CCE-Aggregation IE 72.4, Lower-bound-CCE-Aggregation IE 72.5, optional MUST-Category IE 72.6 and optional DCI-M variances table IE 72.7.

The dynamic signalling part 73 comprises layer-1 (i.e. physical layer) signalling in the form of a DCI-E 74 or a DCI-E 74 and an associated DCI-M 78, which are transmitted dynamically on a subframe basis to the RRC-Configured MUST-UE(s) who are scheduled to receive one or more downlink (DL) shared data channels on a DL subframe.

The DCI-E 74 comprises a legacy DCI 75, which has been enhanced to include a dynamic MUST switching indicator field 76, which is a 1-bit field. The value "0" indicates that the associated shared channel(s) are transmitted in non-MUST mode, i.e. the shared channel is intended for only the near-UE and the reception and decoding of the associated DCI-M(s) is not required. The value "1" indicates that the associated shared channels are transmitted in MUST mode, i.e. the signal on the shared channel is the MUST composite signal concurrently intended for both near-UE and far-UE (s). Therefore the reception and decoding of the associated DCI-M(s) is required for extracting assistant information to assist in the detection and decoding of the associated shared channel(s).

The associated DCI-M index field 77 is a 3-bit field, to provide information relating to size variations relate to a predefined baselined DCI-M. For example, a baselined DCI-M may be predefined for the combination of 1 far-UE as a base signal and 1 near-UE as an extended signal, and further variations may relate to combinations of two or more far-UEs as base signals and 1 near-UE as an extended signal, for MUST composited signal generation on subband basis. The skilled addressee will, however, readily appreciate that other combinations of near and far UEs may be provided for.

The variance of a baselined DCI-M may be defined in the DCI-M variances table IE 72.7, which may comprise a lookup table provided to RRC-Configured MUST-UEs by a MUST-capable base station (eNB).

The DCI-M 78 is a predefined 'Downlink Control Information' element carrying MUST related control information elements (IEs) to assist in the detection and decoding of MUST composited signals 79 for a specific MUST category and/or a MUST UE-receiver scheme. For each specific MUST category and MUST UE-receiver scheme, a predefined baseline DCI-M having a fixed size is defined, and can be implicitly determined by both the MUST base station (eNB) and its servicing RRC-Configured MUST-UEs.

Another aspect of the present invention relates to a method for leveraging information elements for finding implicit control signals 60, and a method for transmission and reception of explicit signals 70, enabling the dynamic scheduling of MUST data transmission on a subframe basis.

The method commences when a MUST-UE performs network registration or network attach, in that the MUST-UE informs/reports its baseline receiver scheme information for use in MUST data signal reception and decoding, to the servicing base station. Based on the registered MUST-UE receiver scheme, and the intended servicing MUST category/categories or techniques, the base station (eNB) can determine a set of predefined DCI-M sizes that are implicitly understood by the registered/attached MUST-UE at the time it is RRC-configured for MUST downlink shared channel reception procedure.

Upon the further detection and decoding of an intended DCI-E 74 on a downlink subframe, an RRC-configured MUST-UE can further narrow down the size of the associated DCI-M 78 if there is more than one predefined DCI-M sizes in the set.

In order to transmit MUST downlink shared channel/channels which will be successfully decoded at both near-UE(s) and paired far-UE(s) at a preferred confidence level, a base station (eNB) may periodically select one or more MUST-UEs as near-UEs for pairing with one or more other UEs, including non-MUST capable UEs, as paired far-UE (s), according to a predetermined scheduling algorithm.

Within one or more groups of near-UEs, the base station (eNB) may choose some or all near MUST-UEs to be allocated and configuring with fixed control resources for DCI-M transmission and reception, where the remaining near-MUST-UEs may be allocated the same or different fixed control search spaces for flexible DCI-M scheduling, transmission and reception. This control resource configuration/reconfiguration may be explicitly performed in semi-dynamic fashion through RRC-configuration/reconfiguration, described below.

Figure 4:
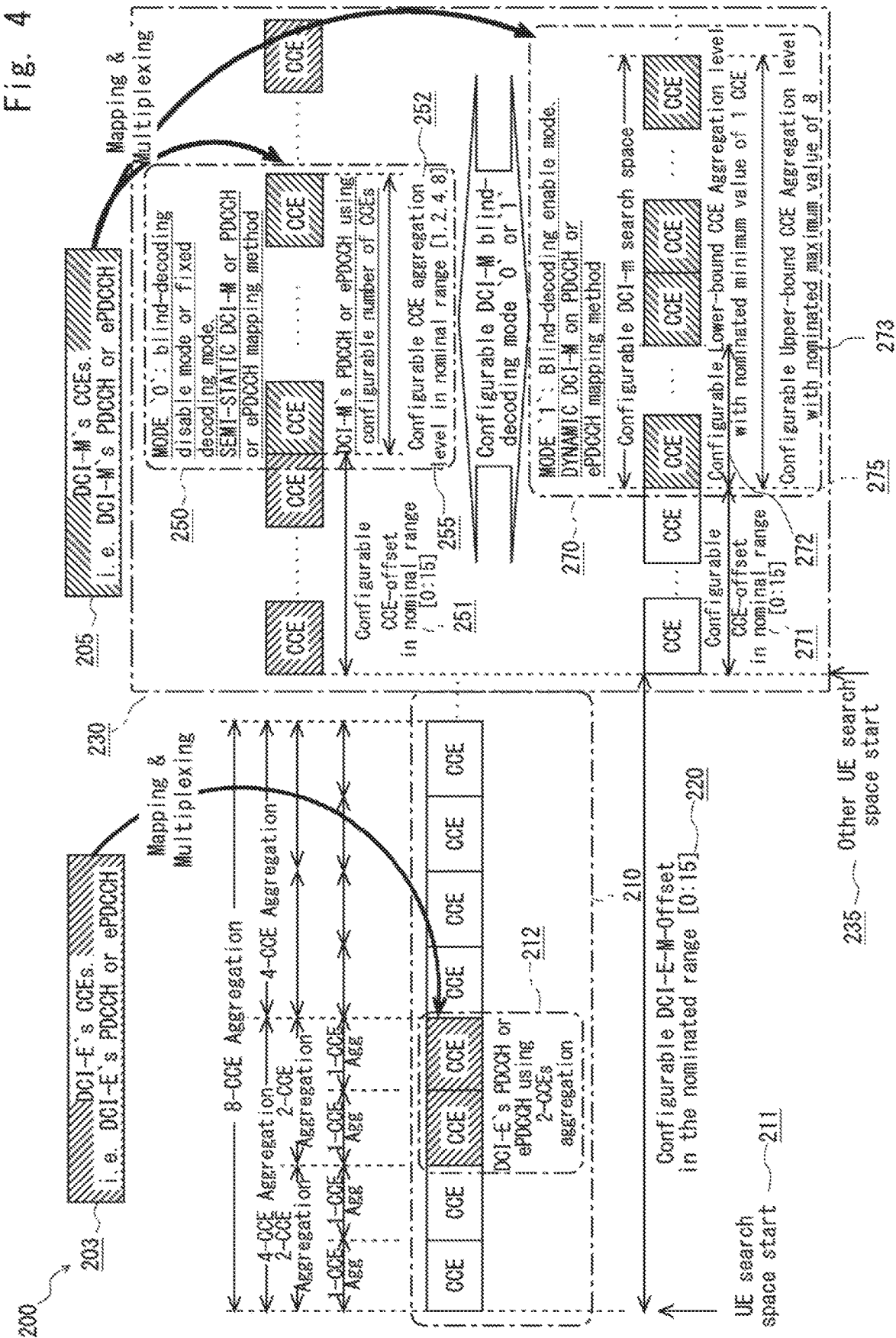
FIG. 4 illustrates an application for MUST operation, according to an embodiment of the present invention.

FIG. 3 illustrates an exemplary RRC-configuration/reconfiguration 72, and FIG. 4 illustrates an application 200 for MUST operation, according to an embodiment of the present invention.

A DCI-E-M-Offset IE 72.1, 220 is a 4-bit field, representing integer values in the range of [0:15]. The DCI-E-M-Offset value 72.1, 220 is used to indicate a start 235 of a control search space 230 for an associated DCI-M 205 transmission relative to the start 211 of a control search space 210 for a DCI-E 203 transmission. In case the DCI-E-M-Offset IE 72.1 is set to zero, both the DCI-E 203 and associated DCI-M 205 are transmitted in the same search space 210 and the start of the search space 211 is implicitly derived from MUST-UE assigned RNTI. Otherwise, the associated DCI-M 205 is transmitted using other UE search space 230.

The CCE-Offset IE 72.2, 251 is a 4-bit field representing integer values in the range of [0:15]. The CCE-Offset IE 72.2, 251 is used to indicate the start of a CCE 255 from which a RRC-configured MUST-UE can extract CCEs for control channel decoding for an intended DCI-M. The CCE-Offset value 72.2, 271 is also used to indicate the start of a CCE 275 from which a RRC-configured MUST-UE can extract CCEs for attempting blind decoding of DCI-Ms 205.

The blind-decoding IE 72.3 is a 1-bit field indicating whether a MUST-UE is configured to perform blind-decoding for an intended DCI-M or not. The value "0" 72.3.1, 250 indicates that fixed control resources are allocated and therefore blind decoding for an intended DCI-M is not required. In this case, the upper-bound-CCE-aggregation-level 72.4 is configured equal to the lower-bound-CCE-aggregation-level 72.5, providing a further means for error detection, as the upper-bound-CCE-aggregation-level 72.4 and the lower-bound-CCE-aggregation-level 72.5 indicate the number of CCEs 252 that a MUST-UE should extract for intended DCI-M 205 decoding.

It should be noted that the extracted CCEs can be consecutive CCEs or alternated CCEs or any other arrangement that can be predefined and implicitly known by or explicitly signalled from the servicing base station (eNB) and MUST-UE(s).

The value "1" 72.3.2, 270 indicates that a fixed control search space will be allocated and therefore blind decoding for one or more intended DCI-Ms may be required. In this case, the configured upper-bound-CCE-aggregation-level 72.4, 273 indicates the highest aggregation level and the configured lower-bound-CCE-aggregation-level 72.5, 272 indicates the lowest aggregation level, thus defining boundaries of the CCE-aggregation-levels that the MUST-UE needs to perform.

Based on the configured upper-bound-CCE-aggregation-level 72.4, 273 and lower-bound-CCE-aggregation-level 72.5, 272, a MUST-UE can further determine all possible CCE-aggregation levels in between, and hence determine the number of blind-decoding attempts that need to be carried for intended DCI-Ms 205.

The MUST-Category IE 72.6 is a 2-bit field representing integer values in the range of [0:3]. The MUST-Category value 72.6 is used to inform the MUST-UE of the MUST transmission technique that will be applied at the service base station (eNB). Upon a reception of an RRC-configuration having a validly configured MUST-Category IE, and together with its registered MUST-receiver scheme, an RRC-configured MUST-UE can implicitly determine the size(s) of DCI-M that are valid for its detection and decoding. An RRC-configured or activated MUST-UE may, on a subframe basis, use a detected DCI-E 203 to further narrow down the size(s) of the concurrently transmitted DCI-M 205 prior to performing decoding.

Periodically, a base station (eNB) may perform MUST related rescheduling and that may result in one or more MUST-UE(s) having allocated fixed control resource allocation to be reconfigured to have fixed control search spaces allocation and via-versa.

On downlink (DL) subframes at and after the activation time of a valid MUST RRC-configuration/reconfiguration, an RRC-configured MUST-UE monitors the configured control search space(s) of DL subframes for one for more intended DCI-E(s). Upon successful detection and decoding of a DCI-E 74 intended for it, the RRC-configured MUST-UE decodes the dynamic MUST switching indicator field 76 in the detected DCI-E 74 to see whether the associated shared channel(s) are transmitted in non-MUST mode or MUST-mode.

If the dynamic MUST switching indicator field 76 in the detected DCI-E 74 indicates that the associated shared data channel(s) are non-MUST signals, the RRC-configured MUST-UE will not perform DCI-M 78 detection and decoding, which conserve its signal processing power, and may thus ignore the current DCI-M 78 process, and perform the reception and decoding of shared data channel(s) per detected DCI-E(s) 75 using non-MUST receiver techniques.

If the dynamic MUST switching indicator field 76 in the detected DCI-E 74 indicates that the associated shared data channel(s) are MUST signals, the RRC-configured MUST-UE decodes the associated DCI-M index field 77 in the detected DCI-E 74 to obtain the DCI-M variation with reference to the baselined DCI-M size, which has been implicitly derived from its reported MUST UE-receiver scheme and the abovementioned RRC configuration/reconfiguration signal.

By using the dynamic MUST switching indicator field 76 and the associated DCI-M index field 77, an RRC-configured MUST-UE is able to perform one-off decoding of an intended DCI-M or perform only a pre-configured number of decoding attempts for DCI-Ms intended for it, which conserves a significant amount of signal processing power.

The decoded assistant information 79 in a detected DCI-M 78 is used by the RRC-configured MUST-UE in detecting and decoding the associated MUST composite shared channel(s). An RRC-configured MUST-UE may concurrently detect and decode DCI-E(s) 74 and DCI-M(s) 78. However, the MUST-UE needs to spend significant signal processing power blind decoding DCI-Ms to cater for all possible DCI-M size variations and/or CCE aggregation levels within the specified range.

Figure 5:
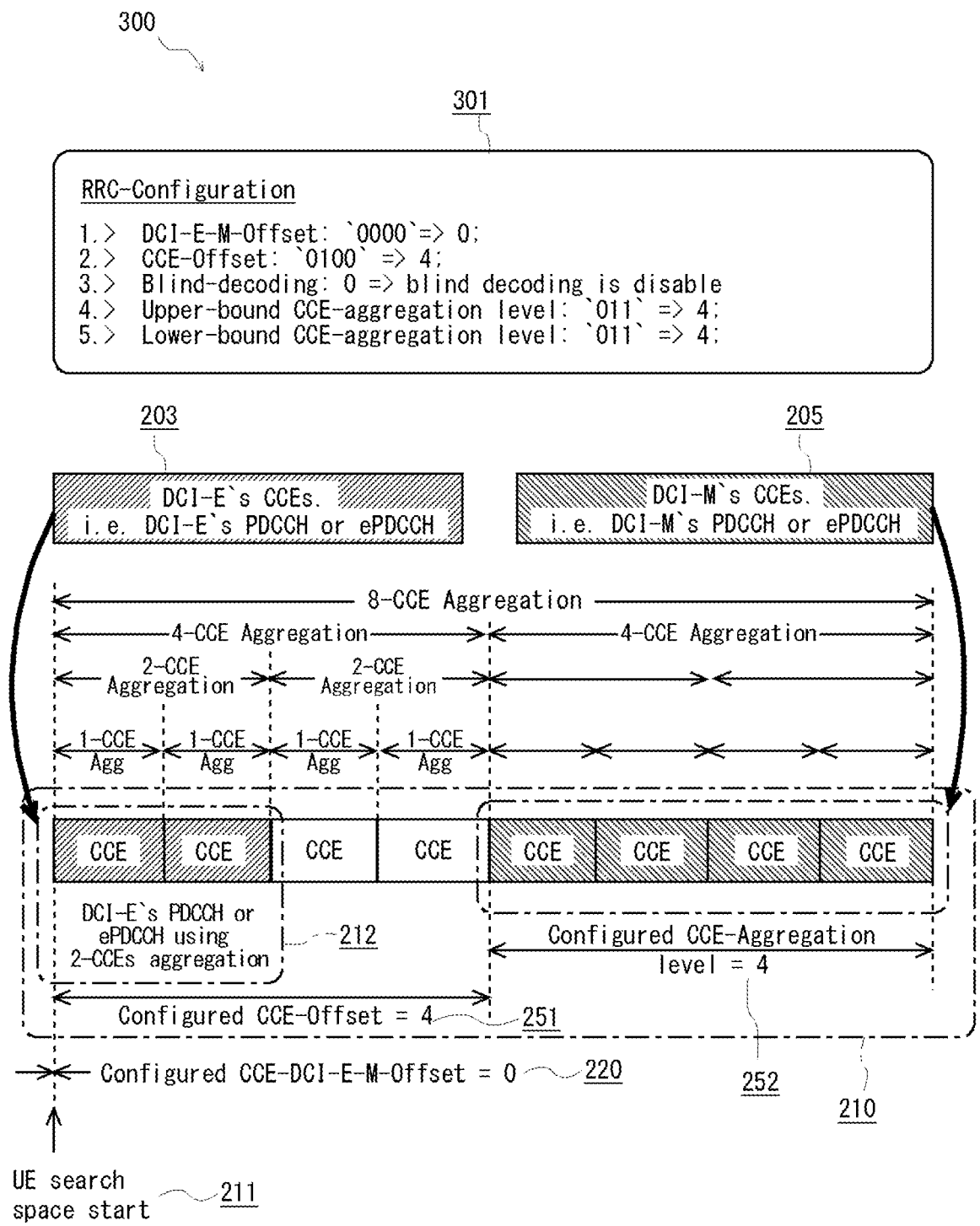
FIG. 5 illustrates a further exemplary MUST configuration, according to an embodiment of the present invention.

FIG. 5 illustrates a further exemplary MUST RRC-configuration 300, according to an embodiment of the present invention. In particular, the method includes transmission and reception of the explicit signal 70, enabling the dynamic scheduling of MUST data transmission on a subframe basis, as illustrated below.

A MUST-UE may be configured with a MUST RRC-configuration/reconfiguration 301 comprising a DCI-E-M-Offset 220 with a value of "0", indicating that the DCI-E and associated DCI-M(s) share the same search space, a CCE-Offset 251 with a value of "4", indicating the start of a CCE, through an offset, from which CCEs for control channel decoding may be extracted, a blind decoding field with a value of "0" indicating that blind-decoding is disabled, an upper-bound CCE-aggregation level with a value of "4" and a lower-bound CCE-aggregation level with a value of "4", indicating that the configured CCE aggregation level 252 is 4.

At and after the activation time, the RRC-configured MUST-UE may monitor the configured control search space 210 on DL subframes for an intended DCI-E 203. A configured control search space 210 may have a start 211 that can be implicitly determined, and the control search space start 211 is used as a reference to determine CCEs 252 that may be allocated for associated DCI-M(s) 205.

Upon the detection of a DCI-E 203 which is scheduled for transmission on CCEs 212, the dynamic MUST switching indicator field is decoded and indicates that there exists an associated DCI-M 205 having a DCI-M size variance as provided in the associated DCI-M index field. The RRC-configured MUST-UE may perform one-off decoding on the extracted 4-CCEs 252 for the intended DCI-M 205. The successful detection of the DCI-M 205 provides assistant information for reception and decoding of MUST composited signal(s) on the associated shared channel(s).

Figure 6:
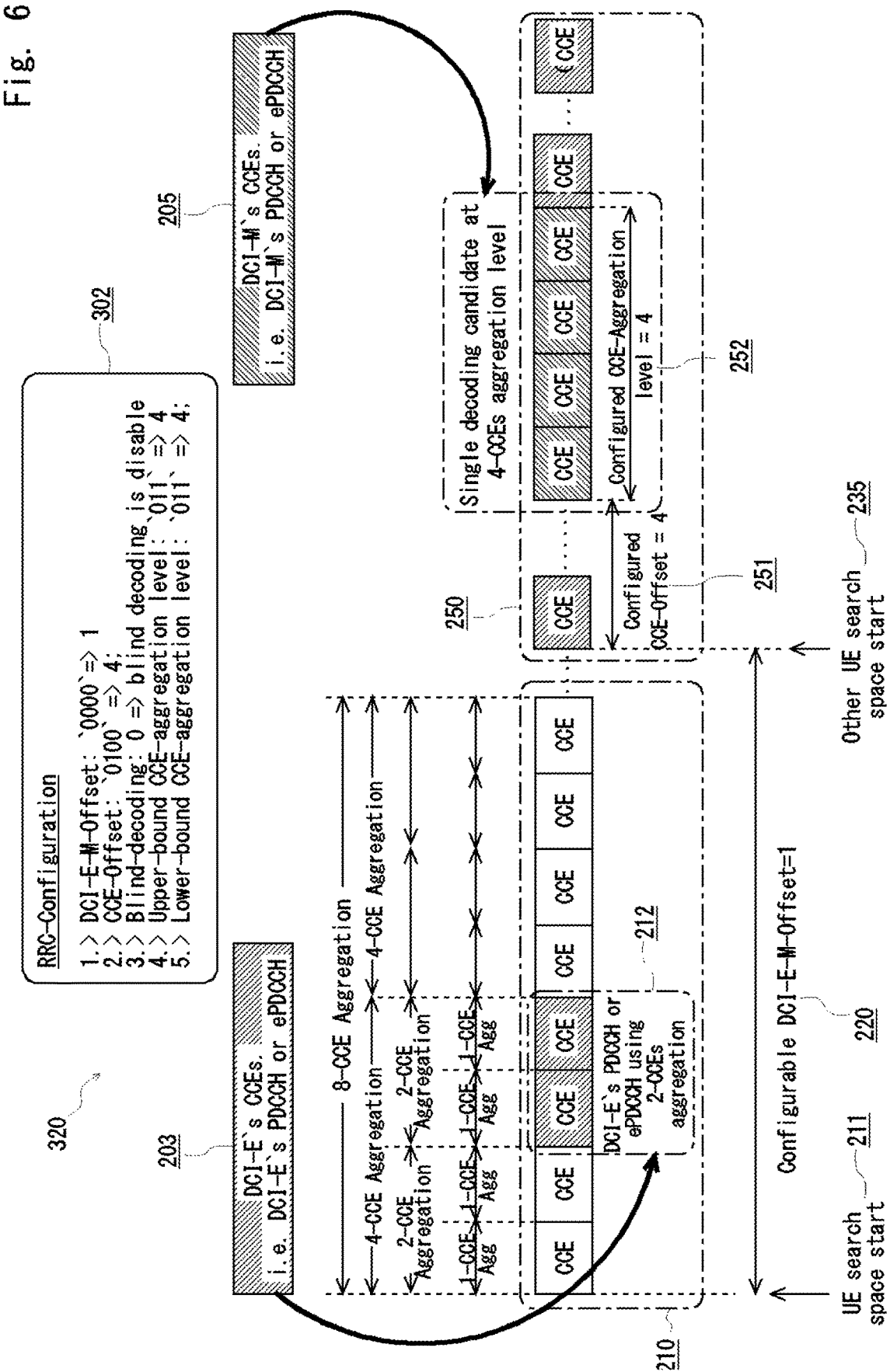
FIG. 6 illustrates a yet a further exemplary MUST RRC configuration, according to an embodiment of the present invention.

FIG. 6 illustrates a further exemplary MUST RRC configuration 320, according to an embodiment of the present invention. The MUST-UE is configured with a MUST RRC-configuration 302 comprising a DCI-E-M-Offset 220 with a value of "1", indicating that the associated DCI-Ms are scheduled for transmission on the next search space and sharing another UE's search space 250, a CCE-Offset 251 with a value of "4", a blind-decoding field with a value "0", indicating that blind decoding is disabled; and an upper-bound CCE-aggregation level field with a value of "4" and a lower-bound CCE-aggregation level field with a value of "4", together indicating a configured CCE-aggregation level 252 of "4".

At and after the activation time, the RRC-configured MUST-UE monitors the configured control search space 210 on DL subframes for DCI-Es 203. The start 211 of the configured control search space 210 may be implicitly determined. The control search space start 211 and the DCI-E-M-Offset 220, which has a value of "1", are used as reference to determine the start 235 of the search space 250 that may include the transmitted DCI-M 205.

The configured CCE-Offset, which has a value of "4", further indicates the starting CCE(s) that may have the transmitted DCI-M 205.

Upon the detection of a DCI-E 203, which may be scheduled for transmission on two CCEs 212, the dynamic MUST switching indicator field thereof is decoded, which indicates the existence of an associated DCI-M 205 having DCI-M size variance per provided in the associated DCI-M index field. As such, the RRC-configured MUST-UE may further perform one-off decoding on the four CCEs 252 for the DCI-M 205. The successful detection of DCI-M 205 provides assistant information for the reception and decoding of MUST composited signal(s) on the associated shared channel(s).

Figure 7:
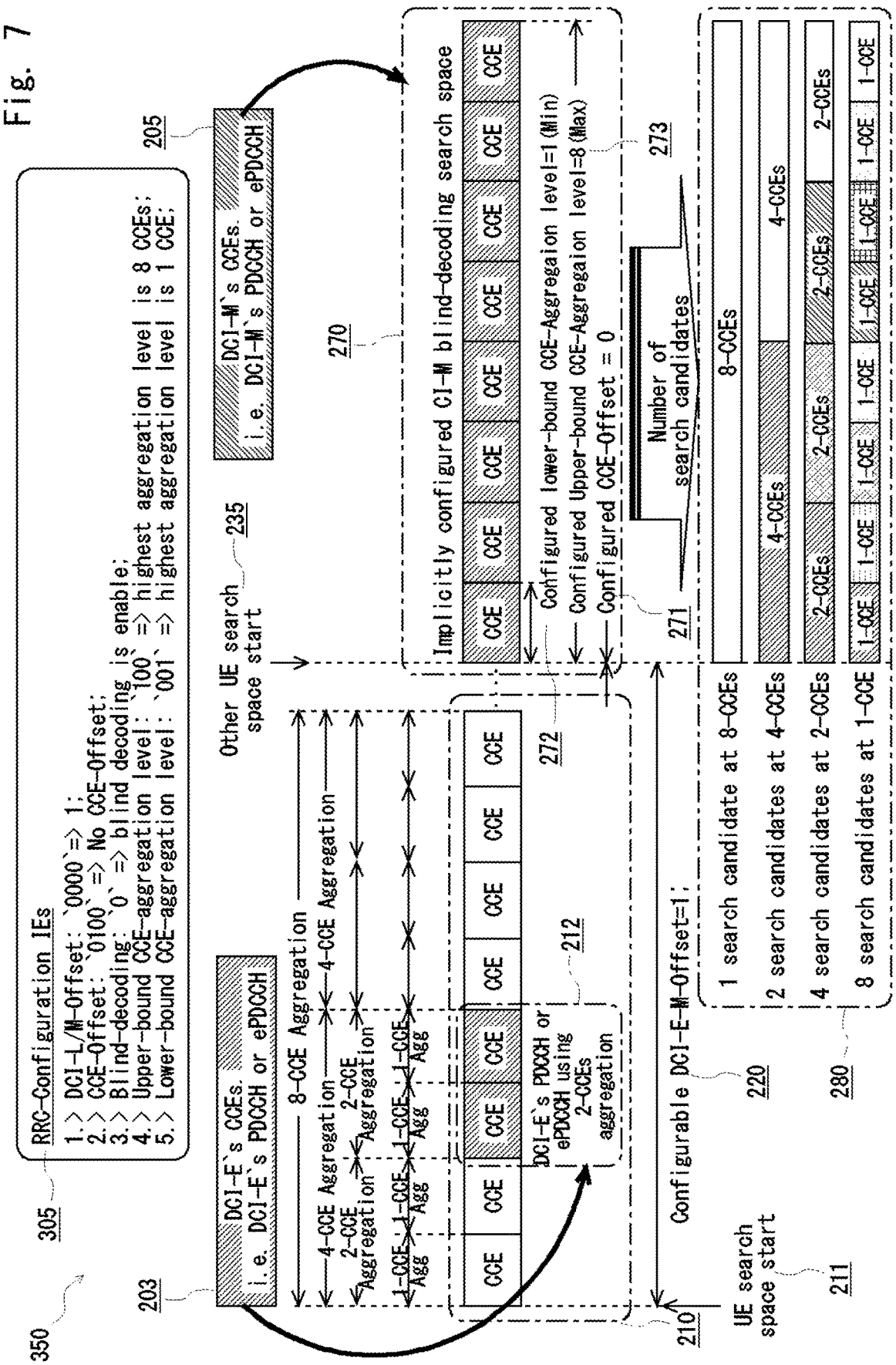
FIG. 7 illustrates a further exemplary MUST RRC configuration, according to an embodiment of the present invention.

FIG. 7 illustrates a further exemplary MUST RRC configuration 350, according to an embodiment of the present invention. A MUST-UE is configured with another MUST RRC-configuration 305 comprising a DCI-E-M-Offset 220 having a value of "1", which indicates that the associated DCI-Ms are scheduled for transmission on the next search space and sharing another UE's search space 270, a CCE-Offset 271 having a value "0", a blind-decoding flag indicating that blind decoding is enabled, an upper-bound CCE-aggregation level 273 having a value of "8", and a lower-bound CCE-aggregation level 272 having a value of "1".

At and after the activation time, the RRC-configured MUST-UE monitors the configured control search space 210 on DL subframes for the DCI-E 203. A configured control search space 210 may have a start 211 that can be implicitly determined. The control search space start 211 and the DCI-E-M-Offset 220, which has a value of "1" are used as reference to determine the start 235 of the search space 270 that may include the DCI-M 205. The configured CCE-Offset, which has the value "0" indicating the starting CCE(s) that may include the transmitted DCI-M 205.

Upon the detection of the DCI-E 203, which may be scheduled for transmission on 2 CCEs 212, the dynamic MUST switching indicator field thereof is decoded and indicates that there exists an associated DCI-M 205 having DCI-M size per provided in the associated DCI-M index field. The RRC-configured MUST-UE may then perform the number of decoding attempts on the 8 CCEs 273 by trying all possible CCE-aggregation levels within the specified upper-bound CCE-aggregation level 273 and lower-bound CCE-aggregation level 272, to decode the DCI-M 205.

Given that the specified upper-bound CCE-aggregation level 273 has the value "8", and Lower-bound CCE-aggregation level 272 has the value "1", the number of blind decoding attempts 280 that the RRC-configured MUST-UE must make is: 1 candidate for 8 CCEs, 2 candidates for 4 CCEs, 4 candidates for 2 CCEs and 8 candidates for 1 CCE, i.e. 15 in total. The successful detection of a DCI-M 205 then provides assistant information for the reception and decoding of MUST composited signal on the associated shared channel(s).

Figure 8:
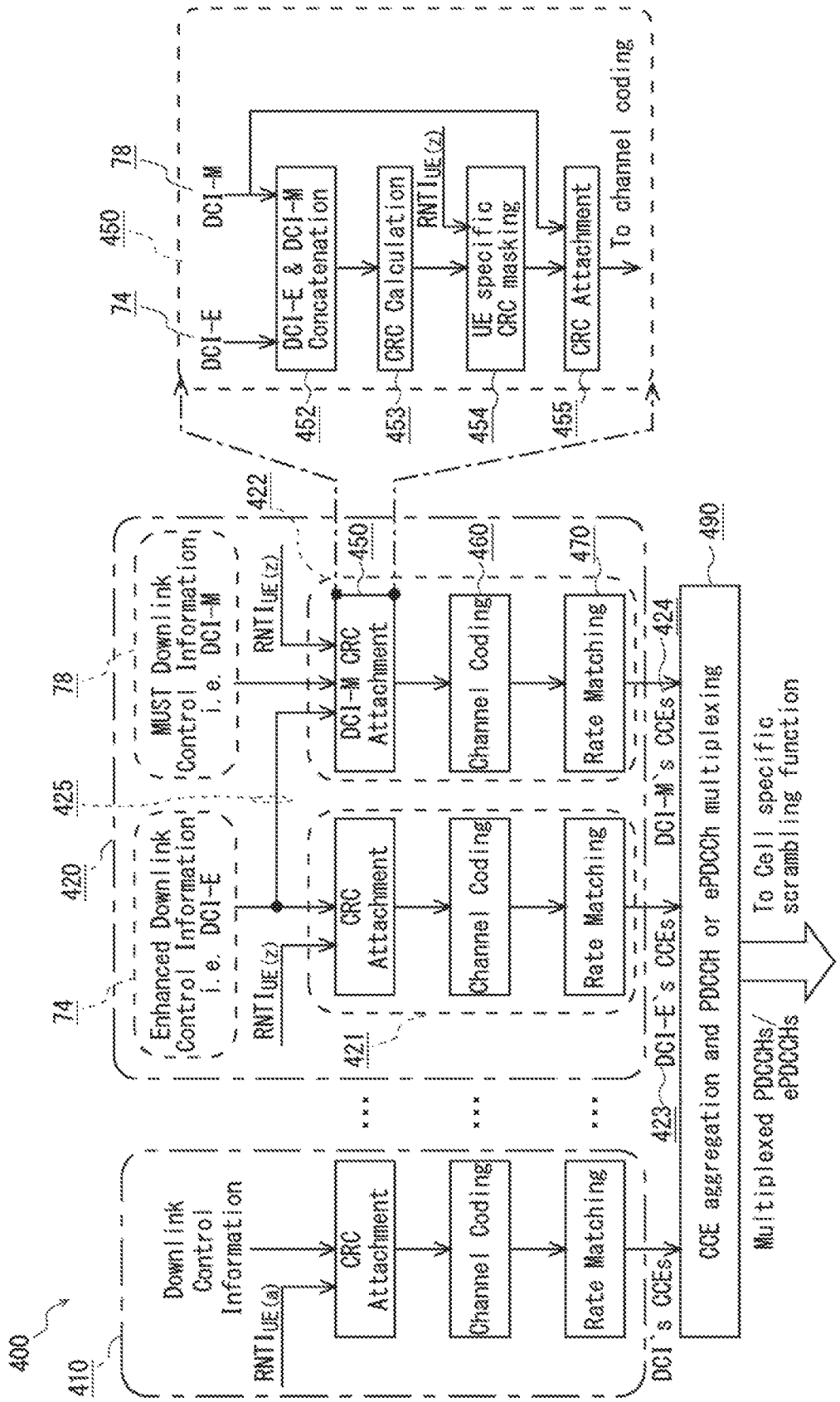
FIG. 8 illustrates a coding structure of downlink control information, which may provide improved security and privacy, and reduce false alarm rates, according to an embodiment of the present invention.

FIG. 8 illustrates a coding structure 400 of a DCI (DCI-E), which may provide improved security and privacy, and reduce the false alarm rate on associated DCI-Ms, according to an embodiment of the present invention.

An RRC-configured MUST-UE monitors DL subframes for intended DCI-E(s) 74 or combination of a DCI-E 74 and one or more associated DCI-M(s) 78, at and after the configured activation time. If the scheduled DL data transmission on a subframe of the associated shared channel to a RRC-configured MUST-UE is not suitable for MUST, a MUST base station (eNB) performs coding 421 on only DCI-E content 74 generating DCI-E CCEs 423 for CCE aggregation and control channels multiplexing 490 with other DCI and/or other UEs's DCIs 410.

If, on the other hand, the scheduled DL data transmission on the associated shared channel(s) to a RRC-configured MUST-UE is suitable for MUST, the MUST base station (eNB) performs coding 420 on the DCI-E content 74 and the associated DCI-M content 78, generating DCI-E CCEs 423 and DCI-M CCEs 424 respectively for CCE aggregation and control channel multiplexing 490 with other DCI and/or other UE's DCIs 410.

The MUST base station (eNB) separately performs coding 421 on a DCI-E 74 and coding 422 on an associated DCI-M 78, where the content of DCI-E 74 is further used as input 425 to coding 422 of an associated DCI-M 78. This allows an RRC-configured MUST-UE with valid and correctly received DCI-E content 74 to be able to detect an associated DCI-M 78.

The DCI-E coding 421 is the legacy LTE coding structure comprising UE specific CRC attachment, channel coding and rate matching to generate the desired CCEs 423 for control channels multiplexing and transmission. The DCI-M coding 422 is a channel coding structure which comprises a DCI-M CRC attachment function 450, a legacy channel coding function 460 and a legacy rate matching function 470 to generate DCI-M CCEs 424 for CCE aggregation and control channel multiplexing 490.

The DCI-M CRC attachment function 450 comprises a DCI-E and DCI-M concatenation function 452, which concatenates DCI-E content to content of an associated DCI-M to form the payload for further CRC calculation.

The CRC calculation function 453 performs error detection on the DCI-M 78 transmission with reference to a valid DCI-E 74 through a Cyclic Redundancy Check (CRC). The payload of the concatenated DCI-M and DCI-E is used to calculate 16 CRC parity bits which are in turn used as input to the UE specific CRC masking function.

The UE specific CRC masking function 454 takes as input the 16 CRC parity bits generated in the CRC calculation function 453, and uses the corresponding Radio Network Temporary Identifier (RNTI), which is an RRC-configured MUST-UE ID, to form the sequence of 16 UE-specific masked CRC parity bits.

In the CRC attachment function 455, the 16 UE-specific masked CRC parity bits are attached or concatenated to the DCI-M bits for further channel coding at 460.

Without a valid and correctly detected DCI-E, and assigned RNTI, an RRC-configured MUST-UE or other UE who intends to intercept a DCI-M cannot correctly detect a DCI-M which has been processed through the above DCI-M channel coding structure 450.

Figure 9:
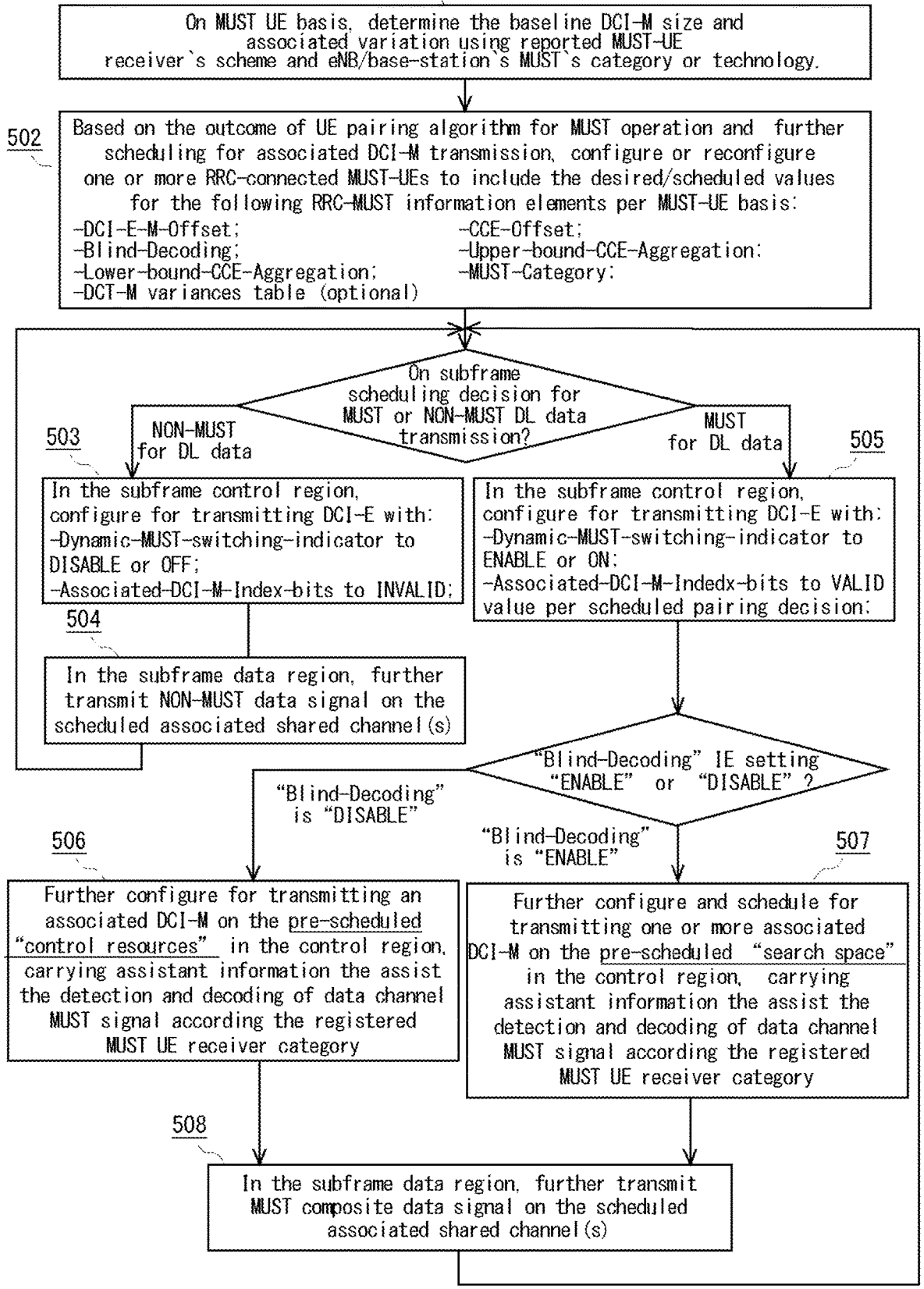
FIG. 9 illustrates a method providing a signalling architecture and for providing operational procedures for enabling MUST operation, according to an embodiment of the present invention.

FIG. 9 illustrates a method 500 providing a signalling architecture and for providing operational procedures for enabling MUST operation, according to an embodiment of the present invention. The method 500 is for being implemented at a MUST base-station (eNB).

At step 501, the method 500 includes determining the size of one or more baseline DCI-Ms, and associated variations that will be used for DL data transmission to the MUST-UE, according to the receiver scheme of the MUST UE, which was reported by the MUST-UE at network registration or network attach, and the MUST technique/category that is used for generating MUST composite signals by the base station (eNB).

At step 502, and based on the outcome of a UE pairing algorithm and scheduling of DCI-M transmission, the MUST base station (eNB) configures or reconfigures one or more RRC-connected MUST-UEs with an RRC-MUST-configuration or reconfiguration. This may be performed on a UE basis to all appropriate MUST-UEs.

At step 503, and at or after the activation time of a valid RRC-MUST-configuration or reconfiguration, the MUST base station (eNB) determines that MUST on a subframe of a DL shared channel scheduled for a particular MUST-UE as near UE and is not recommend, for example because its paired far-UE is no longer suitable for being used as a base signal, or the far-UE has no schedule DL data on that subframe. As a result, enabling MUST transmission would result in performance degradation.

On that subframe, the MUST base station (eNB) provides to the MUST-UE control information in the form of a DCI-E for the reception and decoding of the associated shared channel(s) and transmit non-MUST signal(s) on the scheduled shared channel(s) to the MUST-UE. The dynamic MUST switching-indicator field of the DCI-E is set to DISABLE, and the associated DCI-M-index field is set to INVALID.

At step 504, and in the subframe data region, the MUST base station (eNB) transmits a non-MUST data signal on the scheduled associated shared channel(s) and to the MUST-UE.

At step 505, at or after the activation time of a valid RRC-MUST-configuration, the MUST base station (eNB) determines that MUST on a subframe of a DL shared channel scheduled for a particular MUST-UE as near UE is recommend, for example because there is at least one paired far-UE where the transmit MUST composite signal on the shared channel(s) is likely decodable at the MUST-UE (near-UE). As a result, enabling MUST transmission would result in a performance gain.

On that subframe, the MUST base station (eNB) provides to the MUST-UE control information in the form of a DCI-E and associated DCI-M(s), for the reception and decoding of the associated shared channel(s). The dynamic MUST switching-Indicator field of the DCE-E is set to ENABLE, and the associated DCI-M-index field is set to a VALID value, enabling correct DCI-M size determination at the MUST-UE.

If the blind-decoding IE in the RRC-MUST configuration was set to DISABLE, the MUST base station (eNB) transmits an associated DCI-M on the pre-scheduled control resources at step 506. On the DCI-M(s), the MUST base station (eNB) includes assistant information to assist the MUST-UE in the detection and decoding of MUST composite signal(s) on shared channel(s) intended to the MUST-UE (i.e. the near-UE) and the far-UE(s);

If, on the other hand, the blind-decoding IE in the MUST-UE RRC-configuration was set to ENABLE, the MUST base station (eNB) transmits one or more associated DCI-M(s) on the pre-scheduled control search space, at step 507. The DCI-M(s) include assistant information to assist the detection and decoding of MUST composite signal(s) on the scheduled shared channel(s) intended to the MUST-UE (near-UE) and far-UE(s).

At step 508, and in the subframe data region on the scheduled associated shared channel(s), the MUST composite data signal is transmitted.

Figure 10:
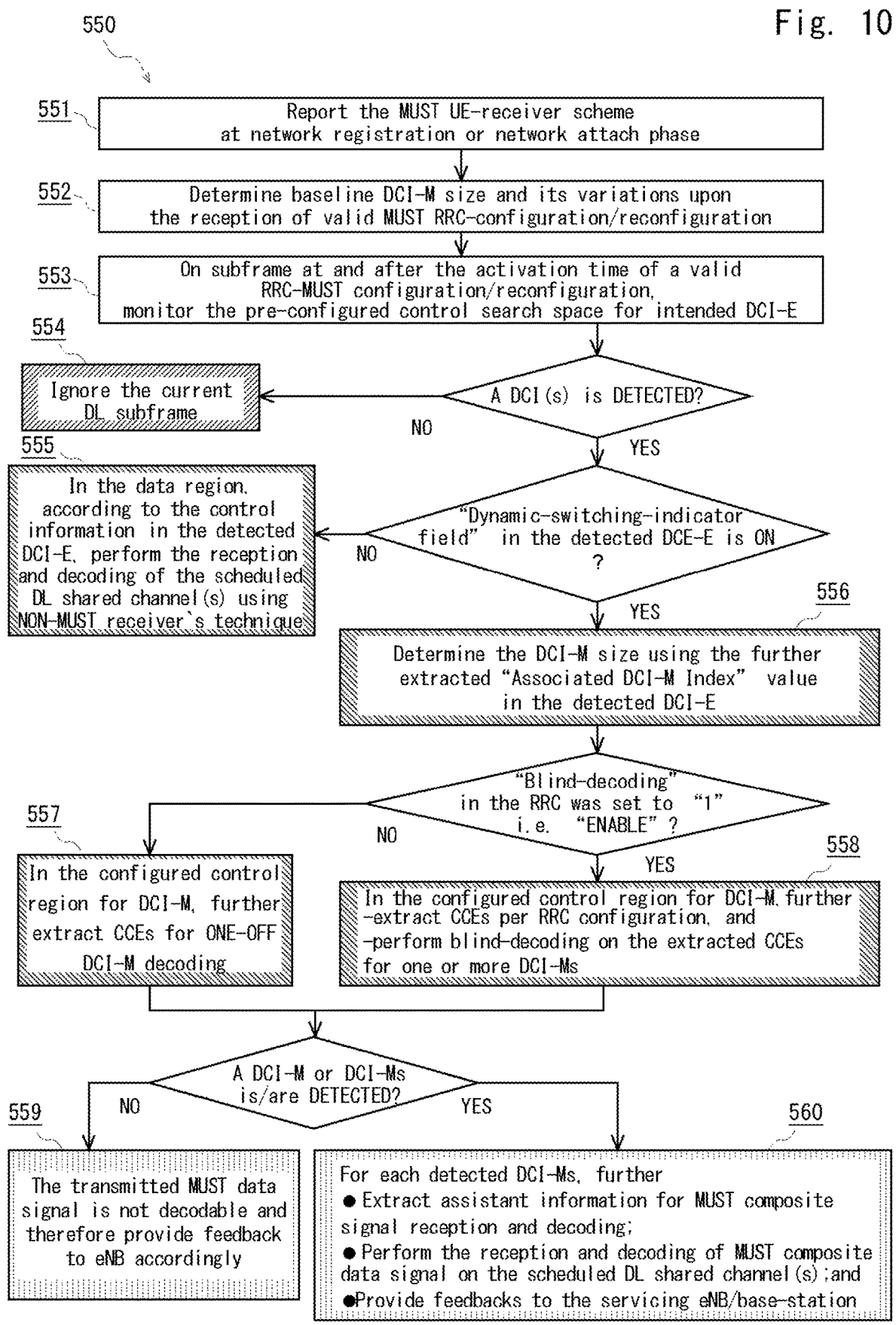
FIG. 10 illustrates a method, for being implemented at a MUST-UE, according to an embodiment of the present invention.

FIG. 10 illustrates a method 550, for being implemented at a MUST-UE, that corresponds with the method 500 at the MUST base station (eNB), that provides the signalling architecture and operational procedure for enabling MUST operation at the MUST UE.

At step 551, at the network registration phase or network attach phase, a MUST-UE reports its MUST-receiver scheme to the servicing base station (eNB).

At step 552, and upon receipt of a valid RRC-configuration message for MUST operation (i.e. a RRC-MUST-configuration/reconfiguration) from its servicing base station (eNB), the MUST-UE determines the baselined DCI-M size(s) and the associated variations that will be used in DCI-M detection.

At step 553, and on DL subframes at and after the activation time of a valid RRC-MUST-configuration/reconfiguration, the RRC-configured MUST-UE monitors its pre-configured control search space(s) for DCI-E(s).

At step 554, and upon unsuccessful detection of a DCI-E intended for the UE, the UE determines that there is no DL data scheduled for it in the current DL subframe and therefore skips or ignore the DL subframe.

At step 555, and upon successful detection of a DCI-E intended for the UE, wherein the dynamic-switching-indicator field of the DCI-E is set to "0" (i.e. OFF), the RRC-configured MUST-UE determines that the scheduled DL data on the associated shared channel(s) is transmitted as a non-MUST signal and therefore further detection of associated DCI-M is not required. The RRC-configured MUST-UE can further perform the reception and decoding of associated shared channel(s) using the control information included in the detected DCI-E.

At step 556, and upon successful detection of a DCI-E intended for the UE, wherein the dynamic-switching-indicator field of the DCI-E is set to "1" (i.e. ON), the RRC-configured MUST-UE determines that the scheduled DL data on the associated shared channel(s) is transmitted as a MUST composite signal and therefore further detection of associated DCI-M(s) for assistant information is required. The associated DCI-M index field of the detected DCI-E is decoded, and the size variation of the transmit DCI-M(s) is determined based thereon.

At step 557, if the MUST-UE has been configured for reconfigured with blind-decoding have a value of "0" (false), the MUST-UE can extract CCEs per RRC-MUST-configuration for one-off DCI-M decoding;

At step 558, if the MUST-UE has been configured with blind-decoding having a value of "1" (true), the MUST-UE can extract CCEs per RRC-MUST-configuration for further DCI-M blind decoding, where the number of blind decoding attempts required is determined based upon the RRC-MUST-configuration.

At step 559, if no associated DCI-M is detected, the MUST-UE may determine that the associated shared channel(s) are not decodable and therefore provide feedback to its serving base station (eNB) accordingly.

At step 560, if one or more associated DCI-Ms are detected, for each detected DCI-M the MUST-UE further extracts assistant information for MUST composite signal reception and decoding, receives and decodes the MUST composite signal on the associated DL shared channel, and provides feedback to the servicing base station (eNB).

Embodiments of the invention described above enable dynamic switching between non-MUST and MUST-composite signal transmission and reception on subframe basis, without reconfiguration or additional signalling.

Certain embodiments of the invention enables forward compatibility or flexibility in DCI format design, that allows further evolution and future adoption of better MUST transmission and reception techniques without significant specification changes.

Embodiments of the invention provide efficient control resource utilisation and reduce the amount of blind decoding that a MUST-UE should perform in detecting DL control information.

Certain embodiments of the invention enabling a second DCI (i.e. DCI-M) to share the same search space as the first DCI transmission, or another UE's search space when it is not in use.

Embodiments of the invention provide efficient error detection techniques enable detection of a false alarm the second downlink control information.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian provisional patent application No. 2016902850, filed on Jul. 20, 2016, the disclosure of which is incorporated herein in its entirety by reference.

REFERENCE SIGNS LIST 203, 205 DCI-M
210, 230, 250, 270 search space
212, 252, 273 CCEs
220 DCI-E-M-Offset
251, 271 CCE-Offset
255, 275 CCE

The invention claimed is:

1. A data communication method for use in an advanced cellular wireless communication system supporting Multi-User Superposition Transmission (MUST), the method comprising:
receiving, from a MUST-UE, a MUST receiver scheme;
determining a baseline size of second downlink control information according to the received MUST receiver scheme and a MUST transmission technique;
configuring the MUST-UE to operate according to a MUST configuration, the MUST configuration including the MUST transmission technique; and
transmitting, to the MUST-UE:
first downlink control information, including an indication that MUST is used;
second downlink control information including assistant information according to the determined baseline size; and
a MUST composite data signal on an associated DL shared channel, according to the MUST transmission technique.

2. The method of claim 1, further comprising determining that MUST transmission should be used, wherein the second downlink control information and the MUST composite data signal are transmitted in response thereto.

3. The method of claim 1, wherein the first downlink control information enables dynamic switching between non-MUST and MUST-composite signal transmission and reception on a subframe basis.

4. The method of claim 1, wherein the MUST configuration includes search space scheduling information for second downlink control information.

5. The method of claim 1, wherein the MUST configuration is associated with an activation time, and the first downlink control information, the second downlink control information, and the MUST composite data signal are transmitted at or after the activation time.

6. The method of claim 1, wherein the MUST configuration is provided using Radio Resource Control (RRC) signaling.

7. The method of claim 1, wherein the MUST configuration includes an offset information element (IE), to inform the MUST-UE of the start of a prescheduled control search space on which it may search for second downlink control information.

8. The method of claim 1, wherein the MUST configuration includes a control channel element offset IE, to inform the MUST-UE of the starting CCE from which the MUST-UE can extract CCEs for decoding of the second downlink control information.

9. The method of claim 1, wherein the MUST configuration includes a blind decoding IE to inform the MUST-UE whether it needs to perform blind-decoding for the second downlink control information.

10. The method of claim 1, wherein the MUST configuration includes an upper bound CCE aggregation level IE, and a lower bound CCE aggregation level IE, indicating upper and lower bounds of the number of CCEs being used for blind decoding for the second downlink control information respectively.

11. The method of claim 1, wherein the first downlink control information comprises an enhanced 3GPP LTE legacy DCI, further including a dynamic switching indicator field, indicating whether MUST is used, and an associated downlink control information index field, for indicating size variances of the second downlink control information according to the baseline size of second downlink control information.

12. The method of claim 1, further comprising:
determining, on a subframe, that a channel condition is not suitable for MUST composite signal transmission; and
transmitting, to the MUST-UE:
first downlink control information, including an indication that MUST is not used; and
a non-MUST data signal on an associated DL shared channel.

13. The method of claim 1, wherein the second downlink control information is coded using the first downlink control information as input.

14. The method of claim 13, where the second downlink control information is coded by concatenating the first downlink control information with the second downlink control information to form a payload for cyclic redundancy check (CRC) coding.

15. A data communication method for use in an advanced cellular wireless communication system supporting Multi-User Superposition Transmission (MUST), the method comprising:
reporting, to a MUST base station, a MUST receiver scheme;
receiving, from the MUST base station, MUST configuration data including a MUST transmission technique;
determining a baseline size of second downlink control information according to the MUST transmission technique and a MUST receiver scheme;
receiving, from the MUST base station:
first downlink control information, including an indication that MUST is used;
second downlink control information including assistant information according to the determined baseline size; and
a MUST composite data signal on an associated DL shared channel, according to the MUST transmission technique.

16. The method of claim 15, wherein the MUST receiver scheme is reported at network registration or a network attach phase of the associated MUST-UE.

17. The method of claim 15, further comprising:
receiving, from the MUST base station:
first downlink control information, including an indication that MUST is not used;
a non-MUST data signal on an associated DL shared channel.

18. The method of claim 15, where the first downlink control information includes a dynamic switching indicator field, indicating that MUST is used, and an associated downlink control information index field, indicating sizes of the second downlink control information according to the baseline size of second downlink control information.

19. The method of claim 15, further comprising extracting control channel elements (CCEs) according to the MUST configuration, and decoding the second downlink control information from the CCEs.

20. An advanced wireless communication system including:
a plurality of UEs, including at least a MUST-UE; and
an advanced base station, the advanced base station configured to:
receive, from the MUST-UE, a MUST receiver scheme;
determine a baseline size of second downlink control information according to the received MUST receiver scheme and a MUST transmission technique;
configure the MUST-UE to operate according to a MUST configuration, the MUST configuration including the MUST transmission technique; and
transmit, to the MUST-UE:
first downlink control information, including an indication that MUST is used;
second downlink control information including assistant information according to the determined baseline size; and
a MUST composite data signal on an associated DL shared channel, according to the MUST transmission technique.

* * * * *

UNITED STATES PATENT AND TRADEMARK OFFICE
CERTIFICATE OF CORRECTION

| | |
|---|---|
| PATENT NO. | : 10,771,127 B2 |
| APPLICATION NO. | : 16/319008 |
| DATED | : September 8, 2020 |
| INVENTOR(S) | : Phong Nguyen |

It is certified that error appears in the above-identified patent and that said Letters Patent is hereby corrected as shown below:

In the Specification

Column 1, Background Art, Abbreviations, Line 55; Delete "Interfence" and insert --Interference-- therefor Column 7, Summary of Invention, Line 56; After "channel(s).", insert --¶In yet another form, the present invention provides a method for use at a MUST-UE. At a network registration or network attach phase, a MUST-UE may report to the servicing MUST-BS, its baseline receiver's technique used for MUST composite data signal reception and decoding. On a valid MUST RRC-configuration or reconfiguration message reception, a MUST-UE may further determine the baseline size of a second DCI and other variations that it will use for detecting second DCI(s).--

Signed and Sealed this
First Day of December, 2020

Andrei Iancu
*Director of the United States Patent and Trademark Office*